United States Patent
Kato et al.

(10) Patent No.: US 8,242,991 B2
(45) Date of Patent: Aug. 14, 2012

(54) LIQUID CRYSTAL DISPLAY APPARATUS

(75) Inventors: Eiji Kato, Kanagawa (JP); Naoki Ohashi, Kanagawa (JP)

(73) Assignee: Sony Corporation (JP)

( * ) Notice: Subject to any disclaimer, the term of this patent is extended or adjusted under 35 U.S.C. 154(b) by 373 days.

(21) Appl. No.: 12/658,170

(22) Filed: Feb. 4, 2010

(65) Prior Publication Data

US 2010/0207934 A1    Aug. 19, 2010

(30) Foreign Application Priority Data

Feb. 18, 2009    (JP) .................................. 2009-035062

(51) Int. Cl.
*G09G 3/36* (2006.01)
(52) U.S. Cl. ............................ 345/87; 345/204; 349/134
(58) Field of Classification Search ............ 345/87–100, 345/204; 349/123, 125, 130, 134
See application file for complete search history.

(56) References Cited

U.S. PATENT DOCUMENTS

| | | | |
|---|---|---|---|
| 2005/0146665 A1* | 7/2005 | Tanaka .......................... | 349/134 |
| 2007/0008474 A1* | 1/2007 | Hashimoto .................... | 349/130 |
| 2008/0055529 A1* | 3/2008 | Shirasaka et al. ............. | 349/143 |

FOREIGN PATENT DOCUMENTS

JP    07-301778 A    11/1995

\* cited by examiner

*Primary Examiner* — Amare Mengistu
*Assistant Examiner* — Hong Zhou
(74) *Attorney, Agent, or Firm* — Lerner, David, Littenberg, Krumholz & Mentlik, LLP

(57) ABSTRACT

A liquid crystal display apparatus includes a plurality of pixels arranged in a matrix shape and a drive circuit for actively driving the plurality of pixels. Each of the pixels has a laminated structure including a pixel electrode, a first alignment film, a liquid crystal layer, a second alignment film, and a counter electrode. The liquid crystal layer includes a liquid crystal molecule having a vertical alignment property. The first alignment film and the second alignment film are inorganic alignment films formed by obliquely depositing an inorganic material. The drive circuit has a first calculation section for extracting a first positional information, a second calculation section for extracting a second positional information, a third calculation for calculating a third positional information, and a fourth calculation section for calculating a third video signal.

7 Claims, 10 Drawing Sheets

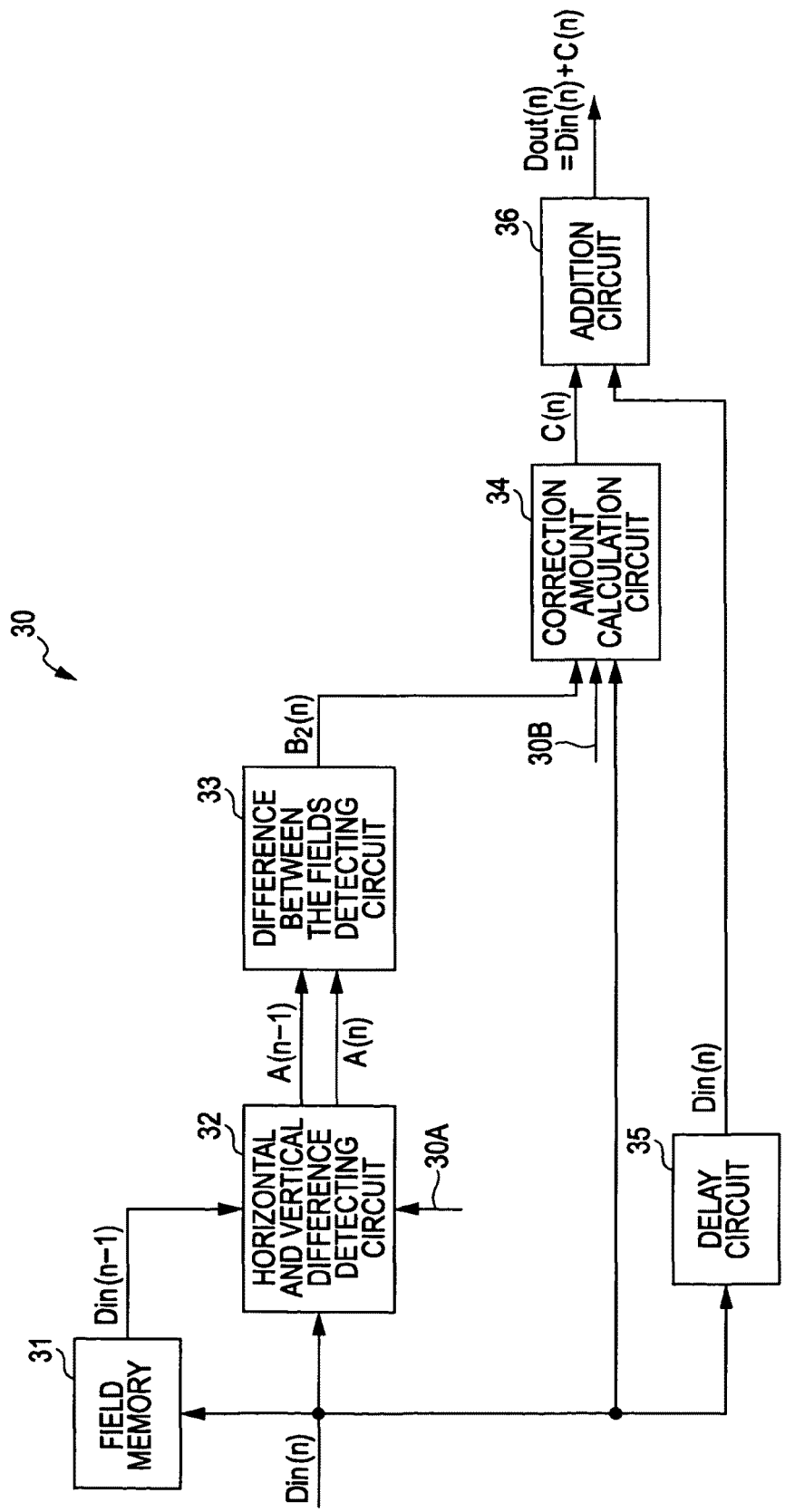

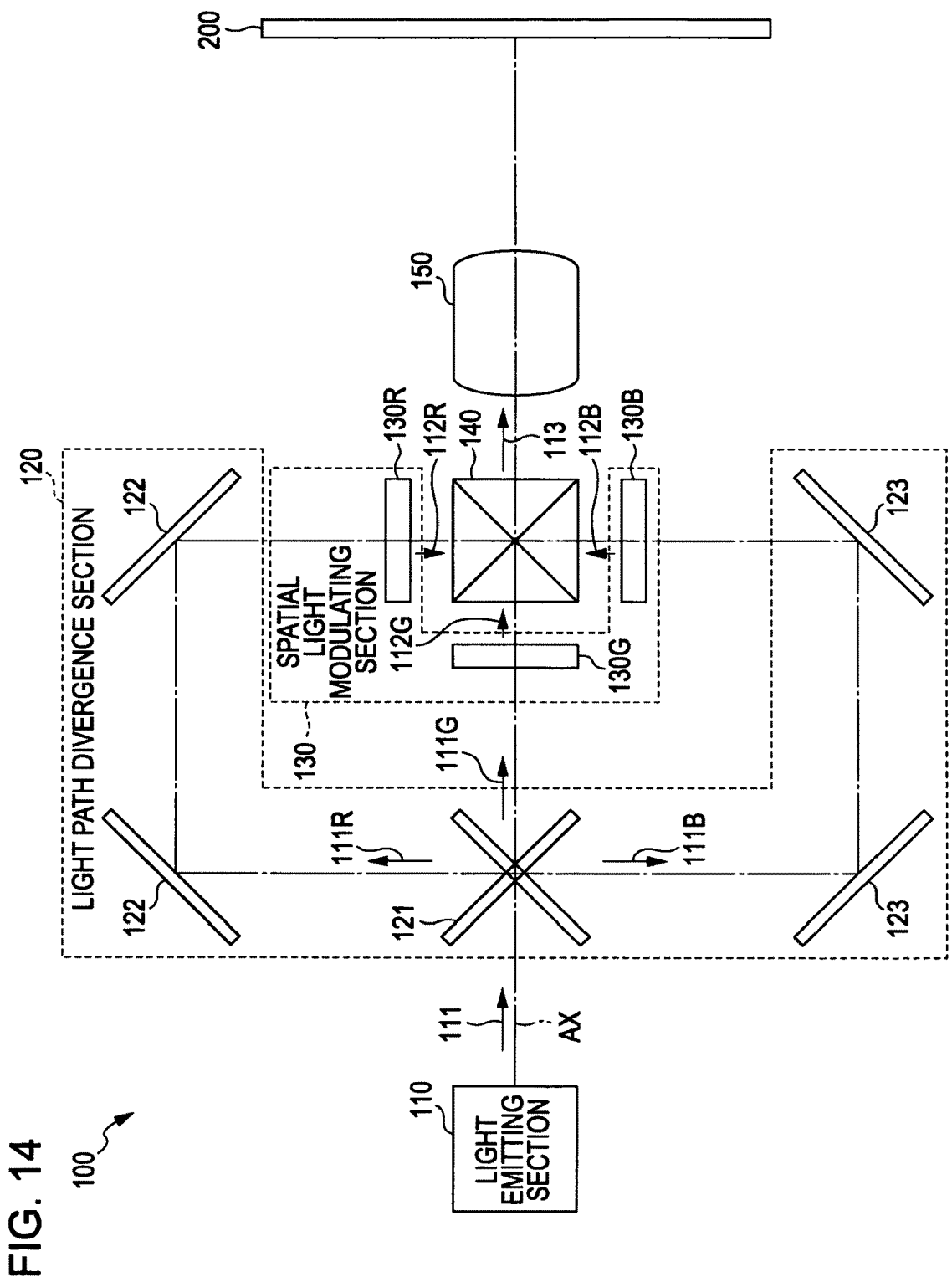

LIQUID CRYSTAL DISPLAY APPARATUS

CROSS-REFERENCE TO RELATED APPLICATION

The present application claims priority from Japanese Patent Application No. JP 2009-035062 filed in the Japanese Patent Office on Feb. 18, 2009, the entire content of which is incorporated herein by reference.

BACKGROUND OF THE INVENTION

1. Field of the Invention

The present invention relates to a liquid crystal display apparatus that displays video using a corrected video signal.

2. Description of the Related Art

As a display element used in a video displaying device, an active type liquid crystal display element in which a liquid crystal layer is installed through an alignment film between a semiconductor driving element substrate and a transparent electrode substrate is disclosed (see Japanese Unexamined Patent Application Publication No. H07-301778). The semiconductor driving element substrate is the semiconductor substrate on which a driving element for driving a circuit and pixel electrode and the like are installed. Meanwhile, the transparent electrode substrate is a transparent electrode on which the transparent electrode or the like is installed. Alignment film is intended to align the liquid crystal molecules in a predetermined aligning state.

In the liquid crystal display element, when a voltage is applied between the pixel electrode and the transparent electrode, alignment state of the liquid crystal molecules is changed according to the potential difference between the electrodes, and the optical properties of a liquid crystal layer is also changed accompanying with the change in the alignment state. Since optical modulation can hereby be performed using changes of the optical properties of the liquid crystal layer, video can be displayed using the liquid crystal display element.

Among the liquid crystal display elements, especially a liquid crystal display element, which utilizes a liquid crystal having a vertical alignment property (so-called vertical alignment liquid crystal) has a high contrast and a rapid response speed, it is noted that display capability can be improved. In a case where the vertical alignment liquid crystal is used, since liquid crystal molecules are aligned vertically to the substrate surface of the semiconductor driving element substrate when application voltage is zero, a display state of so-called normally black mode is obtained. Meanwhile, the liquid crystal molecules are inclined to the substrate surface, when voltage is applied, and optical transmittance is changed. Especially, in this case, if the inclination directions of the liquid crystal molecules at the time of inclination are not identical to each other, non-uniformity in the contrast occurs. Accordingly, in order not to cause non-uniformity in the contrast, it is necessary to align the liquid crystal molecules in a state inclined in advance at a slight angle (pre-tilt angle) in a certain direction.

As a method of aligning the vertical alignment liquid crystal in the desired alignment state, there is a method of using an organic alignment film represented by a polyimide, and a method of using an inorganic alignment film represented by a silicon oxide. The former is to control alignment state by rubbing the organic material film, and the latter is to control alignment state by obliquely depositing the inorganic material film. It is noted that the inorganic alignment film is capable of realizing further high luminance improvements in the display image.

Nowadays, in order to realize improvement in high luminance display images, the power of the light source becomes higher, and alignment film is likely exposed to the light with high intensity. For that reason, in view of ensuring the display capability of a projector over a long period, it is preferable to use an inorganic alignment film having a high light-resistance rather than an organic alignment film having a low light-resistance. In a case of using the inorganic alignment film, when the silicon oxide is obliquely deposited, it is possible to control the pre-tilt angle by changing the incidence angle of the deposited particle.

SUMMARY OF THE INVENTION

Recently, not only has increasingly high luminance of the display image been demanded, but also increasingly high definition, and not only the power of the light source but also aperture ratio of pixels has tended to increase. In order to increase aperture ratio, it is necessary to reduce a shielding area in the pixels. However, in case of using the vertical alignment liquid crystal, when the shielding area is made too small, there is a problem in which alignment scattering caused by a lateral electrical field generated between the pixels arises in the display area and an afterimage is visible at the time of display of a moving picture.

It is desirable to provide a liquid crystal display apparatus which is capable of reducing the occurrence of afterimage.

A liquid crystal display apparatus according to an embodiment of the invention includes a plurality of the pixels arranged in a matrix shape, and a drive circuit for actively driving the plurality of the pixels. Each of the pixels has a laminated construction that includes a pixel electrode, a first alignment film, a liquid crystal layer, a second alignment film, and a counter electrode. The liquid crystal layer includes a liquid crystal molecule having a vertical alignment property, and the first and second alignment films are inorganic alignment films formed by obliquely depositing the inorganic material. The drive circuit has a first calculation section, a second calculation section, a third calculation section, and a fourth calculation section. First of all, the first calculation section is configured to calculate a first difference by obtaining a difference in the first video signal of two pixels which are adjacent to each other, considering the deposition direction of the inorganic alignment film. In addition, when the first difference is equal to or larger than a predetermined threshold, the first calculation section is configured to extract first positional information on the pixel corresponding to the deposition direction of the inorganic alignment film in two pixels of the calculation source of the difference. The second calculation section, firstly, calculates a second difference by obtaining the difference in s second video signal anterior to the first video signal, of two pixels which are adjacent to each other, by one field, considering the deposition direction of the inorganic alignment film. In addition, when the second difference is equal to or larger than the threshold, the second calculation section is configured to extract second positional information on the pixels corresponding to the deposition direction of the inorganic alignment film in two pixels of the calculation source of the difference. The third calculation section is configured to calculate a third positional information, on the basis of the first positional information and the second positional information. The fourth calculation section is configured to calculate a third video signal by adding a predetermined correction amount to the first video signal of the pixel corresponding to the third positional information.

In the liquid crystal display apparatus according to an embodiment of the present invention, the first positional information is extracted on the basis of the first video signal and the deposition direction, and at the same time, the second positional information is extracted on the basis of the second video signal and the deposition direction. Here, the first positional information corresponds to positional information on the pixels at the time of displaying the video based on the first video signal in which alignment scattering caused by the lateral electrical field that is generated between the pixels may occur. Meanwhile, the second positional information corresponds to positional information on the pixels at the time of displaying the video based on the second video signal in which alignment scattering caused by the lateral electrical field that is generated between the pixels may occur. For that reason, by calculating the third positional information on the basis of the first positional information and the second positional information, it is possible to calculate the positional information on the pixels that can be displayed as an afterimage at the time of the displaying a moving picture.

The liquid crystal display apparatus according to an embodiment of the invention is configured to calculate the positional information on the pixels that can be displayed as an afterimage at the time of the displaying a moving picture, using the first video signal, the second video signal, and the deposition direction, and add a predetermined correction amount to the first video signal of the pixel corresponding to the positional information. As a result, it is possible to reduce the occurrence of afterimages that may occur at the time of displaying a moving picture.

BRIEF DESCRIPTION OF THE DRAWINGS

FIG. 5 is a functional block diagram illustrating a video signal processing section of FIG. 1 divided into each functional block;

FIG. 14 is a schematic diagram of an image display device according to one application example.

DESCRIPTION OF THE PREFERRED EMBODIMENTS

Hereinafter, an embodiment of the present invention will be described in detail with reference to the drawings. In addition, the description will be made in the following order.
1. Embodiment (liquid crystal display apparatus)
2. Application Example (projector)
3. Modification Example

Embodiment

Schematic Construction

Figure 1:
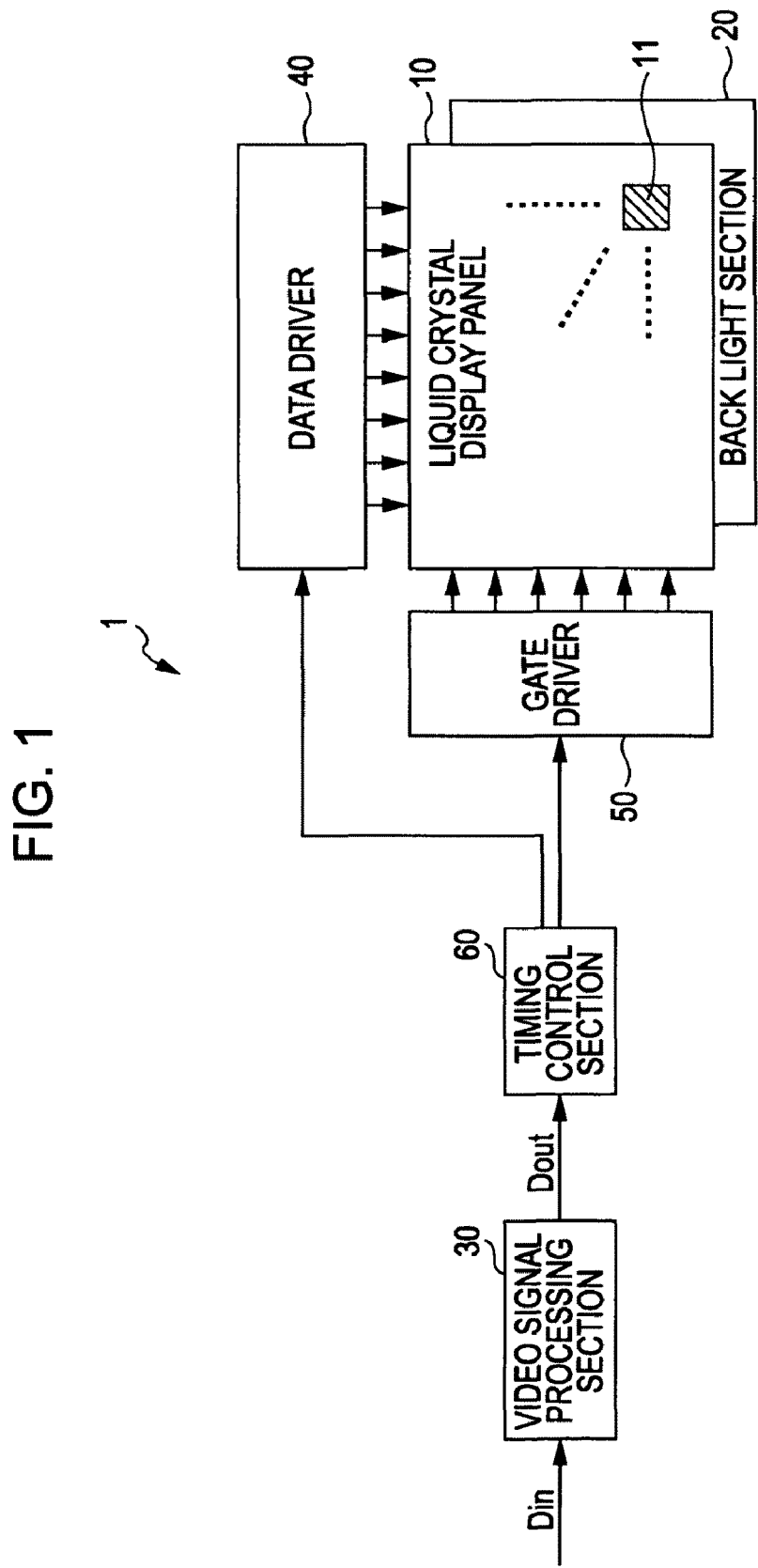
FIG. 1 is a schematic diagram of a liquid crystal display apparatus according to an embodiment of the present invention.

FIG. 1 illustrates one example of the overall construction of a liquid crystal display apparatus 1 according to an embodiment of the present invention. The liquid crystal display apparatus 1 includes a liquid crystal display panel 10, a backlight 20, a video signal processing section 30, a data driver 40, a gate driver 50, and a timing control section 60. In addition, the video signal processing section 30, the data driver 40, the gate driver 50, the timing control section 60, and a pixel circuit described later correspond to one concrete example of a drive circuit of the present invention.

Liquid Crystal Display Panel 10

The liquid crystal display panel 10 is the display panel where a plurality of the pixels 11 are formed in the form of a matrix all over a display section (not shown) of the liquid crystal display panel 10, and the liquid crystal display panel 10 displays an image that is based on video signal Din input from the outside, by actively driving each of the pixels 11 by means of the data driver 40 and the gate driver 50. The video signal Din is a digital signal of a video to be displayed in the display section 10 for each field, and includes the digital signal for each pixel 11.

Figure 2:
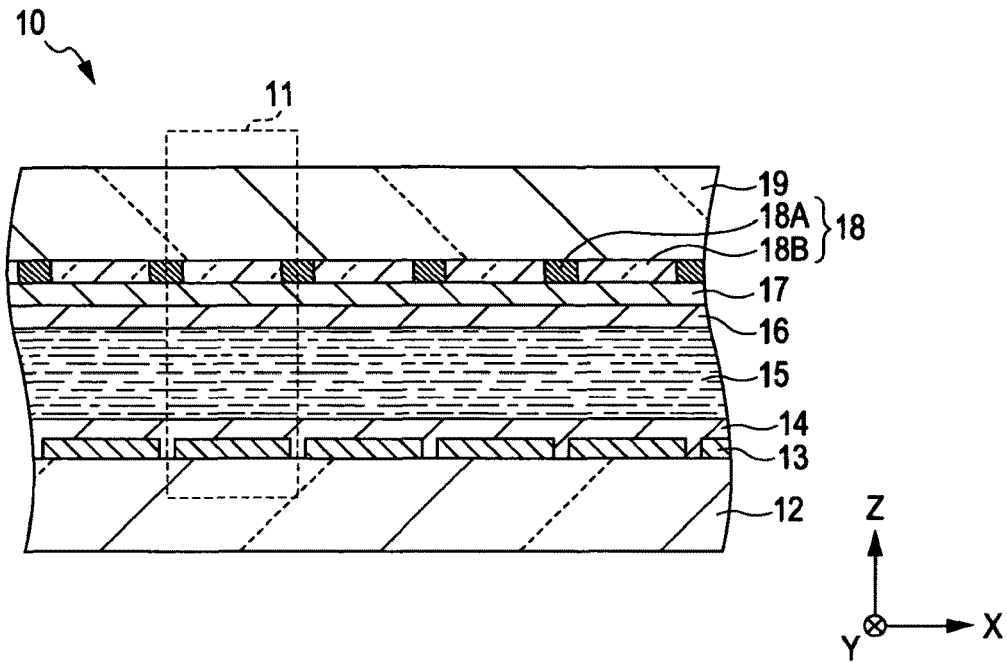
FIG. 2 is a sectional view of a liquid crystal display panel of FIG. 1.

FIG. 2 illustrates one example of a sectional construction of a part of the liquid crystal display panel 10. The liquid crystal display panel 10 has a laminated construction in which a liquid crystal layer is placed through an alignment film between a pair of substrates that are opposite to each other. Concretely, the display section 10 has a TFT (thin film transistor) substrate 12 (a semiconductor driving element substrate), a pixel electrode 13, an alignment film 14, a liquid crystal layer 15, an alignment film 16, a counter electrode 17, a black matrix layer 18, and a counter substrate 19 (transparent electrode substrate) in this order. A part (the part surrounded by dotted lines in the drawing) corresponding to the pixel electrode 13 in the display section 10 is equivalent to the pixels 11. Namely, each pixel 11 has a laminated construction of the pixel electrode 13, alignment film 14, the liquid crystal layer 15, alignment film 16, and the counter electrode 17.

For example, the TFT substrate 12 has an active type pixel circuit on the substrate. For example, the pixel circuit includes a TFT and a capacitive element formed for each pixel 11, and is capable of actively driving each pixel 11. For example, a substrate formed with the pixel circuit is a mono crystalline silicon substrate or a substrate (e.g., a glass plate)

which is transparent to visible light. The counter substrate 19 includes a substrate which is transparent to visible light, e.g., a glass plate.

The pixel electrode 13 and the counter electrode 17 include a transparent electric conduction film such as ITO (Indium Tin Oxide) or the like. For example, the pixel electrode 13 is arranged in the form of a matrix on the TFT substrate 12, and functions as an electrode for each pixel 11. The counter electrode 17 is formed over all of an area which is opposite to the pixel 11 in the counter substrate 19, and functions as an electrode which is commonly used overall in the pixels 11.

Alignment films 14 and 16 are to align the liquid crystal molecule 15A (see, FIG. 3) contained in the liquid crystal layer 15 in a predetermined alignment state. Alignment film 14 (first alignment film) covers a surface of the TFT substrate 12 including the pixel electrode 13, and alignment film 16 (second alignment film) covers the whole surface of the counter electrode 17. Alignment films 14 and 16 are inorganic alignment films formed by inorganic material such as a silicon oxide or the like, and are formed by obliquely depositing the inorganic material. The oblique deposition is a method of forming a film by providing the deposition particles to a target surface from an inclination direction. It is possible to control a pre-tilt angle $\theta$ (described later) of the liquid crystal molecules 15A by changing an incidence angle of the deposition particles to a target surface.

Figure 3:
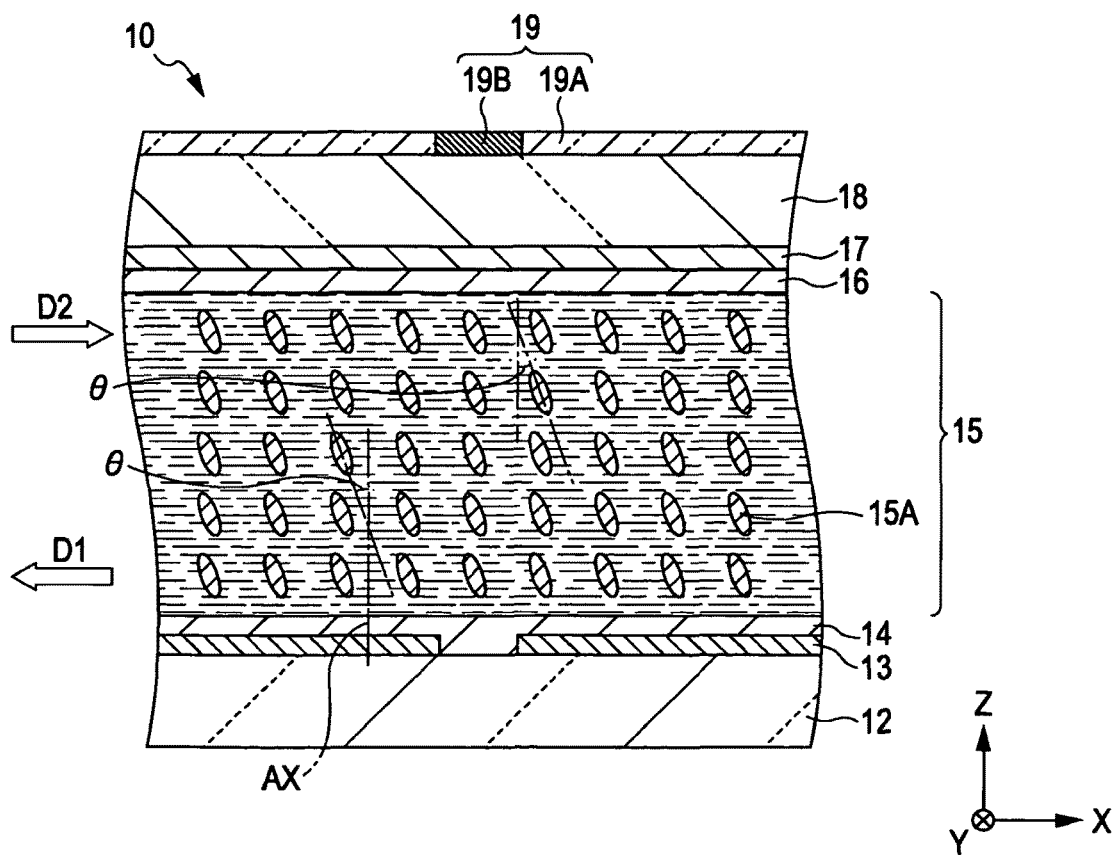
FIG. 3 is an enlarged view of a liquid crystal layer of FIG. 2.

The liquid crystal layer 15 is to modulate an incidence light to the liquid crystal layer 15 by changing an alignment state in response to a voltage application to the pixel electrode 13 and the counter electrode 17. As shown in FIG. 3, the liquid crystal layer 15 includes a liquid crystal molecule 15A having a shape anisotropy. The liquid crystal molecule 15A is a liquid crystal mole having a vertical alignment property, namely a liquid crystal molecule of a VA (Vertical Alignment) mode. The liquid crystal molecule 15A has a property of being aligned vertically to an electric field. The liquid crystal molecule 15A has a property of being aligned horizontally to a surface of the TFT substrate 12, when an electric field is applied vertically to a surface of the TFT substrate 12, by a voltage application to the pixel electrode 13 and the counter electrode 17. The liquid crystal molecule 15A has a property of being influenced by alignment films 14 and 16 in a state of an application voltage of 0 (zero) and being almost vertically aligned to the surface of the TFT substrate 12. Namely, the liquid crystal layer 15 is a liquid crystal layer of a so-called normally black mode.

Strictly, for example, as shown in FIG. 3, the liquid crystal molecule 15A is influenced by alignment films 14 and 16 in a state of application voltage of zero and is inclined at a slight angle in a predetermined direction. This slight inclination (pre-tilt angle $\theta$) defines a direction in which the liquid crystal molecule 15A is easily aligned, when an electric field is applied vertically to the surface of the TFT substrate 12 by the voltage application to the pixel electrode 13 and the counter electrode 17.

Namely, for example, as shown in FIG. 3, alignment film 14 has an alignment property in which the liquid crystal molecule 15A is inclined at pre-tilt angle $\theta$ in one direction $D_1$ (a first direction) in the surface, when seen from a front direction of the liquid crystal display panel 10 in a state of application voltage of zero. For example, as shown in FIG. 3, alignment film 16 has an alignment property in which the liquid crystal molecule 15A is inclined at pre-tilt angle $\theta$ in a direction $D_2$ which is actually opposite to the first direction $D_1$, when seen from the front direction of the liquid crystal display panel 10 in a state of application voltage of zero.

Accordingly, for example, as shown in FIG. 3, the liquid crystal molecule 15A contained in the liquid crystal layer 15 is inclined at pre-tilt angle $\theta$ in the first direction $D_1$ in relation to a normal AX of alignment film 14.

Figure 4A:
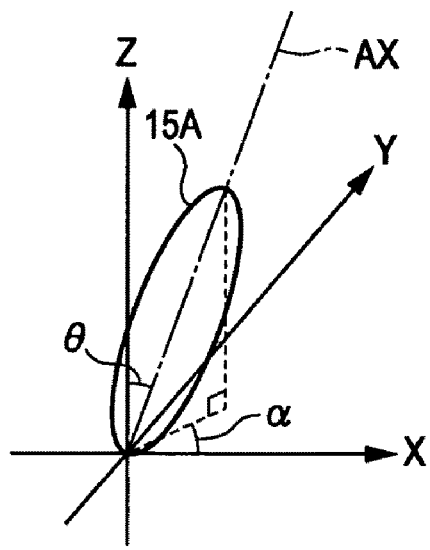
FIGS. 4A and 4B are schematic diagrams for illustrating a pre-tilt angle of a liquid crystal molecule.
Figure 4B:
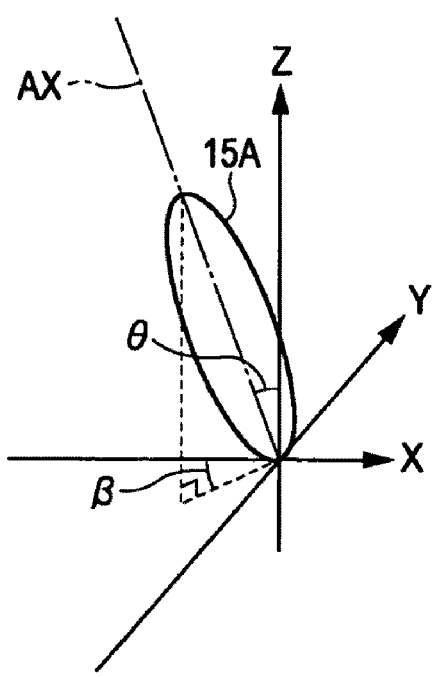

Further, as shown in FIG. 4A, when the liquid crystal molecule 15A is inclined at an angle $\alpha$ in a direction of a first quadrant in a XY plane which is parallel to the surface of the TFT substrate 12, the direction $D_1$ in which the liquid crystal molecule 15A is inclined at the pre-tilt angle $\theta$ also faces toward the first quadrant. At this time, the direction $D_1$ corresponds to a deposition direction of alignment film 14 and has a positive horizontal component and a positive vertical component. In addition, as shown in FIG. 4B, when the liquid crystal molecule 15A is inclined at an angle $\beta$ in the third quadrant direction in an XY plane which is parallel to the surface of the TFT substrate 12, the direction $D_1$ in which the liquid crystal molecule 15A is inclined at the pre-tilt angle $\theta$ also faces toward the third quadrant. At this time, the direction $D_1$ corresponds to the deposition direction of alignment film 14 and has a negative horizontal component and a negative vertical component.

For example, a black matrix layer 18 has a light shielding section 18A and a light transmitting section 18B. The light shielding section 18A has an opening in a part opposite to the pixel electrode 13, and the light transmitting section 18B is placed in the opening. As a result, the black matrix layer 18 has a function which selectively transmits the light from a part corresponding to the pixel electrode 13 in the light passed through the liquid crystal layer 15, and selectively shields the light from a part corresponding to a gap between the pixel electrodes 13 in the light passed through the liquid crystal layer 15.

The back light 20 is a light source that illuminates the liquid crystal display panel 10 with light, and for example, it includes CCFL (Cold Cathode Fluorescence Lamp) and LED (Light Emitting Diode) or the like.

The data driver 40 provides each of the pixels 11 of the liquid crystal display panel 10 with a drive voltage based on the video signal of one line provided from the timing control section 60. Concretely, the data driver 40 generates a video signal that is an analog signal by performing D/A conversion to a video signal of one line, respectively and outputs it to each pixel 11.

The gate driver 50 line-sequentially drives each pixel 11 in the liquid crystal display panel 10 along a scanning line not shown, in response to a timing control by the timing control section 60.

The video signal processing section 30 performs a predetermined image processing to video signal Din input from outward, and at the same time outputs the video signal Dout after a predetermined image processing is performed to the timing control section 60. The video signal Dout includes a digital signal for each pixel 11 like the video signal Din.

Next, the interior construction of the video signal processing section 30 will be described. FIG. 5 illustrates the video signal processing section 30 divided into functional blocks. For example, as shown in FIG. 5, the video signal processing section 30 has a field memory 31, a horizontal and vertical difference detecting circuit 32, a difference between the fields detecting circuit 33, a correction amount calculation circuit 34, a delay circuit 35, and an addition circuit 36.

The field memory 31 holds a video signal Din input from outward, until the next video signal Din is input from outward. Accordingly, when video signal Din(n) (first video signal) of an input order n as video signal Din is input into the video signal processing section 30, the horizontal and vertical difference detecting circuit 32 holds video signal Din(n-1) (second video signal) of input order n-1 as video signal Din.

Here, n is a positive number which means an input order of the video signal Din. Accordingly, the video signal Din(n−1) corresponds to a video signal Din before one field in relation with the video signal Din(n).

The horizontal and vertical difference detecting circuit 32 derives positional information on the pixels 11 in which alignment scattering caused by a lateral electric field generated between the pixels 11 can occur in the display area. The horizontal and vertical difference detecting circuit 32 derives positional information A(n) (first positional information) in which alignment scattering can occur, from a video signal Din(n) input from outward. In addition, the horizontal and vertical difference detecting circuit 32 derives positional information A(n−1) (second positional information) on the pixels 11 in which alignment scattering can occur, from a video signal Din(n−1) read from the field memory 31.

The horizontal and vertical difference detecting circuit 32 calculates a difference in the video signals Din(n) of the two pixels which are adjacent to each other, considering the deposition direction of alignment films 14 and 16. Concretely, first of all, in cases where the deposition direction information 30A indicates that a direction $D_1$ has a horizontal component, the horizontal and vertical difference detecting circuit 32 calculates a difference (horizontal difference, first difference) in the video signals Din of the two pixels 11 which are horizontally adjacent to each other, from the video signal Din(n). In addition, in cases where the deposition direction information 30A indicates that a direction $D_1$ has a vertical component, the horizontal and vertical difference detecting circuit 32 calculates the differences (vertical difference, first difference) in the video signals Din of the two pixels 11 which are vertically adjacent to each other. Next, in cases where the calculated difference (horizontal difference, vertical difference) are equal to or greater than a predetermined threshold, the horizontal and vertical difference detecting circuit 32 extracts positional information on the pixels 11 which are selected based on a predetermined regulation in two pixels 11 of the calculation source of the difference. The positional information including this positional information corresponds to above described positional information A(n). The predetermined threshold is, for example, a value that can be obtained by subtracting a black display video signal from a white display video signal.

Similarly, the horizontal and vertical difference detecting circuit 32 calculates a difference in the video signals Din(n−1) of the two pixels 11 which are adjacent to each other, considering the deposition direction of alignment films 14 and 16. Concretely, first of all, in cases where the deposition direction information 30A indicates that a direction $D_1$ has a horizontal component, the horizontal and vertical difference detecting circuit 32 calculates a difference (horizontal difference, second difference) in the video signals Din of the two pixels 11 which are horizontally adjacent to each other from the video signal Din(n−1). In addition, in cases where deposition direction information 30A indicates that a direction $D_1$ has a vertical component, the horizontal and vertical difference detecting circuit 32 calculates the differences (vertical difference, second difference) in the video signals Din of the two pixels 11 which are vertically adjacent to each other. Next, in cases where the calculated differences (horizontal difference, vertical difference) are equal to or greater than a predetermined threshold, the horizontal and vertical difference detecting circuit 32 extracts positional information on the pixels 11 which are selected based on a predetermined regulation in two pixels 11 of the calculation source of the difference. That which includes this positional information is equivalent to above-described positional information A(n−1).

For example, above predetermined threshold is a value that can be obtained by subtracting the black display video signal from the white display video signal.

Here, the horizontal difference is derived considering the deposition direction information 30A input into the horizontal and vertical difference detecting circuit 32. Concretely, in cases where the deposition direction information 30A indicates that a direction $D_1$ has a positive horizontal component, the horizontal difference is calculated, for example, by subtracting a video signal Din of a left side pixel 11 of the pixels 11 from a video signal Din of the singled out pixel 11. At this time, in cases where the horizontal difference is equal to or greater than a predetermined threshold, the horizontal and vertical difference detecting circuit 32, for example, extracts positional information on the singled out pixel 11 (namely, a right side pixel 11 in the two pixels 11 of the calculation source of the difference). Meanwhile, in cases where deposition direction information 30A indicates that a direction $D_1$ has a negative horizontal component, the horizontal difference is calculated, for example, by subtracting a video signal Din of a right side pixel 11 of the pixels 11, from a video signal Din of the singled out pixel 11. At this time, in cases where the horizontal difference is equal to or greater than a predetermined threshold, the horizontal and vertical difference detecting circuit 32, for example, extracts a positional information on the singled out pixel 11 (namely, the left side pixel 11 in the two pixels 11 of the calculation source of the difference).

The vertical difference is also extracted, considering the deposition information 30A input into the horizontal and vertical difference detecting circuit 32. Concretely, in cases where the deposition direction information 30A indicates that a direction $D_1$ has a positive vertical component, the vertical difference is calculated, for example, by subtracting a video signal Din of a lower side pixel 11 of the pixels 11, from a video signal Din of the singled out pixel 11. At this time, in cases where the vertical difference is equal to or greater than a predetermined threshold, the horizontal and vertical difference detecting circuit 32, for example, extracts positional information on the singled out pixel 11 (namely, an upper side pixel 11 in the two pixels 11 of the calculation source of the difference). Meanwhile, in cases where the deposition direction information 30A indicates that a direction $D_1$ has a negative vertical component, the vertical difference is calculated, for example, by subtracting a video signal Din of the upper side pixel 11 of the pixels 11 from a video signal Din of the singled out pixel 11. At this time, in cases where the vertical difference is equal to or greater than a predetermined threshold, the horizontal and vertical difference detecting circuit 32, for example, extracts a positional information on the singled out pixel 11 (namely, the upper side pixel 11 in the two pixels 11 of the calculation source of the difference).

Figure 6:
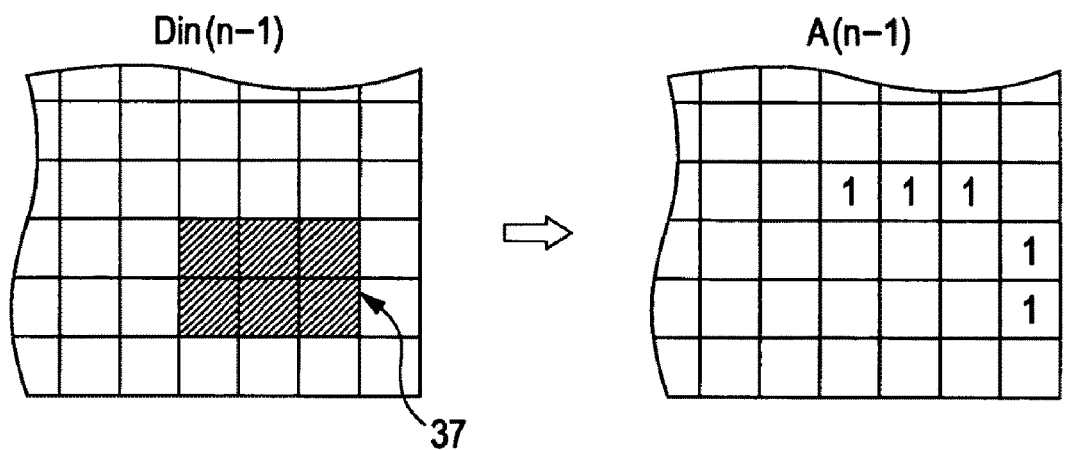
FIG. 6 is a concept diagram illustrating one example of a state where positional information on the pixel in which an alignment scattering may occur in a display area is derived.
Figure 7:
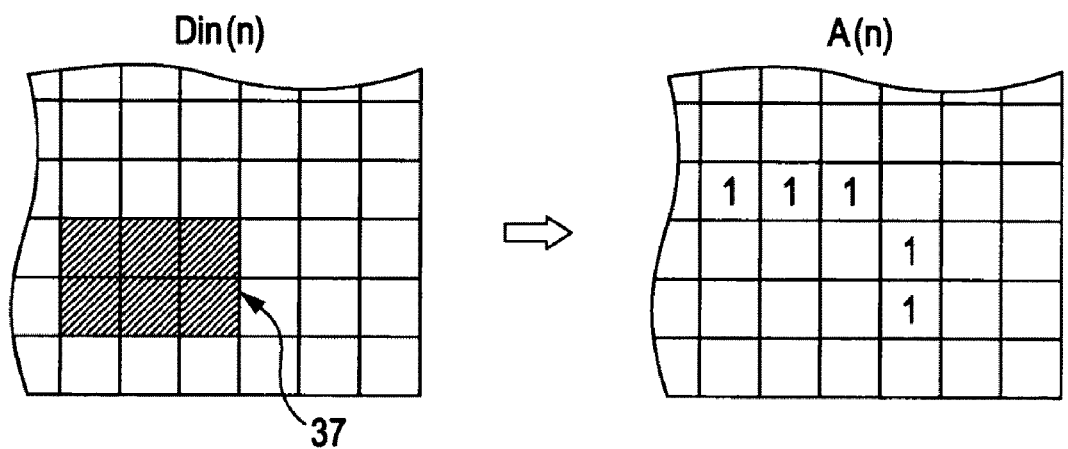
FIG. 7 is a concept diagram illustrating another example of a state where positional information on the pixel in which an alignment scattering may occur in a display area is derived.

Hereinafter, concrete contents of positional information A(n), A(n−1) in cases where the deposition direction information 30A indicates that the direction $D_1$ has a positive horizontal component and a positive vertical component will be described with reference to FIGS. 6 and 7. For example, when the video signal Din(n−1) includes video signal Din of a contrast distribution as shown in FIG. 6, the positional information A(n−1), for example, has 1, corresponding to a position of the pixel 11 adjoining an upper side and a right side of a dark section 37 in the video signal Din(n−1). Similarly, for example, when video signal Din(n) includes video signal Din of a contrast distribution as shown in FIG. 7, the positional information A(n) has, for example, 1, corresponding to a position of the pixel 11 adjoining to the upper side and a right side of the dark section 37 in the video signal Din(n).

The difference-between-the-fields detecting circuit derives positional information on the pixel 11 in which alignment scattering caused by a lateral electric field generated between the pixels 11 can be displayed as an afterimage at the time of the display of a moving picture. The-difference-between-the-fields detecting circuit 33 subtracts positional information A(n) from positional information A(n−1) to derive positional information $B_1(n)$ and then calculates positional information on the pixels 11 exceeding a predetermined threshold from the positional information $B_1(n)$ to derive positional information $B_2(n)$ (third positional information) that may be displayed as an afterimage at the time of the display of a moving picture.

Figure 8:
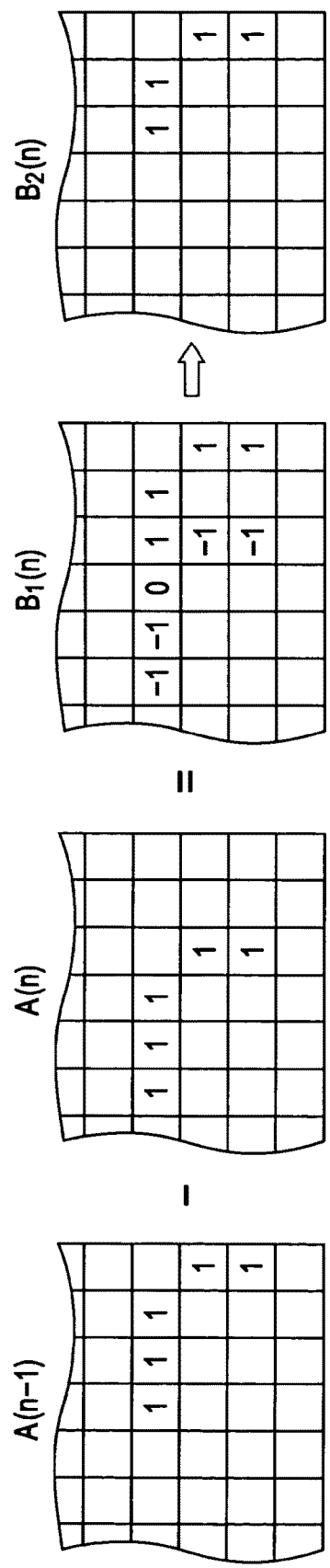
FIG. 8 is a concept diagram illustrating a state where positional information on the pixel in which an alignment scattering may be displayed as an afterimage at the time of displaying a moving picture is derived.

Hereinafter, concrete contents of positional information $B_2(n)$ in cases where the deposition direction information 30A indicates that the direction $D_1$ has a positive horizontal component and a positive vertical component will be described with reference to FIG. 8. FIG. 8 schematically illustrates an operation in The-difference-between-the-fields detecting circuit 33. When the positional information is A(n−1), A(n) has the information as shown in FIG. 8, the positional information $B_1(n)$ has 1, corresponding to a position of 1 contained in the positional information A(n−1) and has −1, corresponding to a position of 1 contained in the positional information A(n). Further, for the place where a position of 1 contained in the positional information A(n−1) and a position of 1 contained in the positional information A(n) overlap, it becomes 0 (zero) through above-mentioned difference processing. In addition, in cases where the predetermined threshold is set to 0 (zero), the positional information $B_2(n)$ has 1 corresponding to the position of 1 contained in the positional information $B_1(n)$. The position of 1 contained in the positional information $B_2(n)$ corresponds to a position of the pixel 11 that is in contact with neither the upper side nor the right side of the dark section 37 in FIG. 7.

Figure 9:
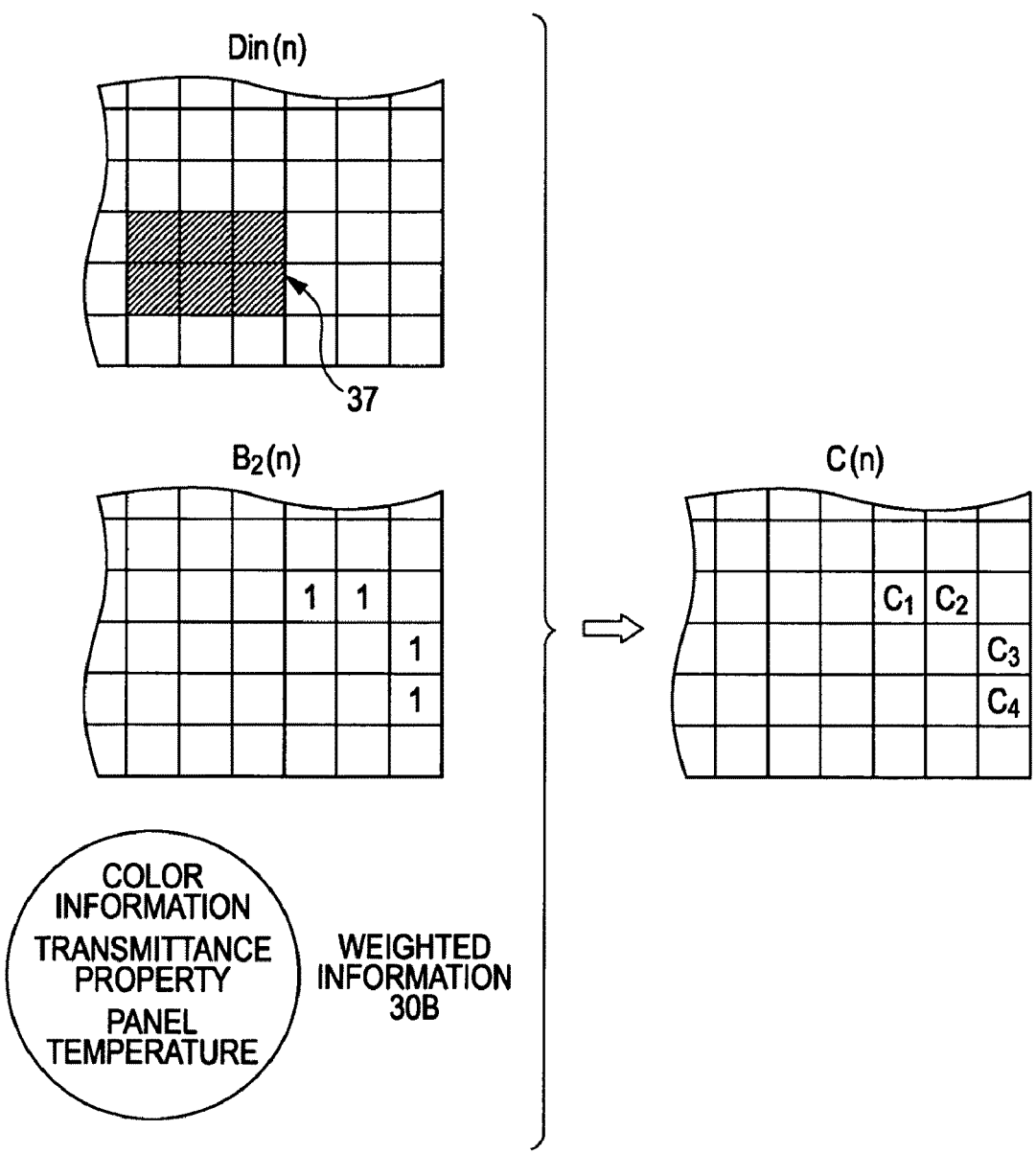
FIG. 9 is a concept diagram illustrating a state where a correction amount of a video signal corresponding to the pixel in which an alignment scattering may be displayed as an afterimage at the time of displaying a moving picture is derived.

The correction amount calculation circuit 34 changes (calculates) a correction amount of the video signal Din corresponding to the pixel 11 that can be displayed as an afterimage at the time of the display of a moving picture. For example, as shown in FIG. 9, the correction amount calculation circuit 34 changes (calculates) the correction amount C(n) to the pixel 11 that can be displayed as an afterimage at the time of the display of a moving picture, on the basis of the video signal Din(n), the positional information $B_2(n)$, and weighted information 30B. For example, at least one of color information, a transmittance property, and temperature information is included in the weighted information 30B. Here, the color information indicates the color information of the video signal Din of the pixel 11 corresponding to the positional information $B_2(n)$ in the video signal Din(n). The transmittance property indicates the transmittance property of the pixel 11 corresponding to the positional information $B_2(n)$ in the video signal Din(n). The temperature information is information on the temperature of the liquid crystal display panel 10 (the temperature of the pixel 11).

The delay circuit 35 holds the video signal Din(n) during the time until the correction amount C(n) in the correction amount calculation circuit 34 is changed (calculated). In addition, the delay circuit 35 outputs the video signal Din(n) in such a manner to match the timing when the correction amount C(n) is output from the correction amount calculation circuit 34 to addition circuit 36.

Addition circuit 36 adds the correction amount C(n) which is input from the correction amount calculation circuit 34 to the video signal Din(n) which is input from the delay circuit 35. In addition, addition circuit 36 outputs video signal (Din (n)+C(n)) (third video signal) obtained by addition as display signal Dout(n).

In the liquid crystal display panel 10 of the present embodiment, a plurality of the pixels 11 arranged in the matrix form are actively driven by a signal voltage provided from the data driver 40 and a scanning voltage provided from the gate driver 50. Here, the signal voltage provided from the data driver 40 is set based on the video signal Dout which is obtained by performing a predetermined correction processing to the video signal Din. For that reason, in the present embodiment, it is not an image in which the video signal Din input from outward is directly reflected, but an image in which the video signal Dout that was subjected to the correction process is reflected and is displayed in the liquid crystal display panel 10.

Correction Order

Next, a correction order of the video signal Din in the liquid crystal display apparatus 1 of the present embodiment will be described. In the present embodiment, in the video signal processing section 30, the video signal Din corresponding to the pixels 11, in which alignment scattering caused by a lateral electric field generated between the pixels can be displayed as an afterimage at the time of the display of the moving picture, is corrected. Concretely, the video signal Din is corrected according to the following order.

Firstly, in the horizontal and vertical difference detecting circuit 32, differences (horizontal difference, vertical difference) are calculated. Concretely, based on a video signal Din(n) input as a video signal Din in the input order n and the deposition direction information 30A, the difference (horizontal difference) in the video signals Din of the two pixels 11 which are horizontally adjacent to each other is calculated. Further, based on a video signal Din(n) and the deposition direction information 30A, the difference (vertical difference) in the video signals Din of the two pixels 11 which are vertically adjacent to each other is calculated. Similarly, based on a video signal Din(n−1) input as a video signal Din in the input order n−1 and the deposition direction information 30A, the difference (horizontal difference) in the video signals Din of the two pixels 11 which are horizontally adjacent to each other is calculated. Further, based on the video signal Din(n−1) and the deposition direction information 30A, the difference (vertical difference) in the video signals Din of the two pixels 11 which are vertically adjacent to each other is calculated.

Next, in the horizontal and vertical difference detecting circuit 32, in cases where the calculated differences (horizontal difference, vertical difference) are equal to or larger than a predetermined threshold, positional information of the pixel 11 which is selected based on a predetermined regulation in the two pixels 11 of the calculation source of the difference is extracted. As a result, positional information on the pixel 11 (A(n), A(n−1)) in which alignment scattering caused by a lateral electric field generated between the pixels can occur in the display area is derived.

Next, in The-difference-between-the-fields detecting circuit 33, positional information A(n) is subtracted from the positional information A(n−1) to derive the positional information $B_1(n)$, and thereafter positional information on the pixel 11 exceeding a predetermined threshold is calculated from the positional information $B_1(n)$. As a result, the positional information $B_2(n)$ of the pixels 11 that can be displayed as an afterimage at the time of the display of the moving picture is derived. Thereafter, in the correction amount calculation circuit 34, based on the video signal Din(n), the positional information $B_2(n)$, and the weighted information 30B, the correction amount C(n) to the pixel 11 that can be displayed as an afterimage at the time of the display of the moving picture is changed (calculated). In addition, in addition circuit 36, the correction amount C(n) is added to the video signal Din(n). As a result, display signal Dout(=Din(n)+C(n)) is generated.

Effects

Figure 10:
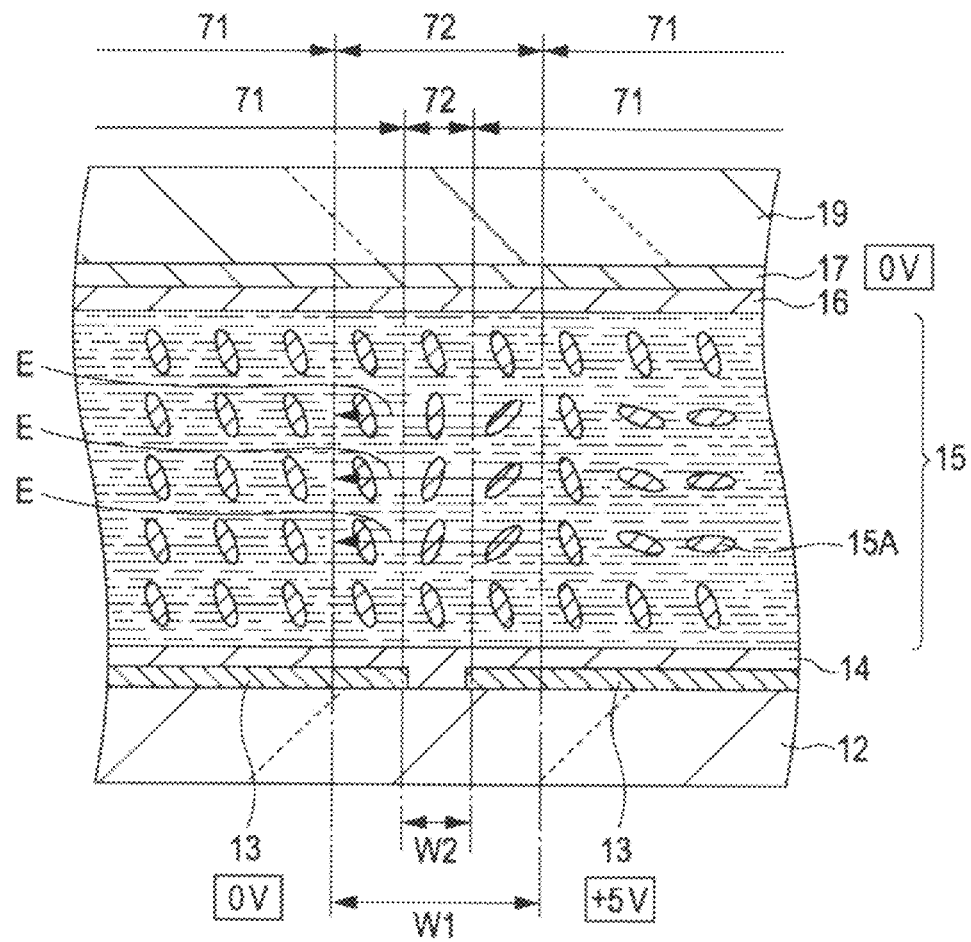
FIG. 10 is a schematic diagram illustrating an alignment state of the liquid crystal molecule when a lateral electrical field is generated between the pixels.
Figure 11:
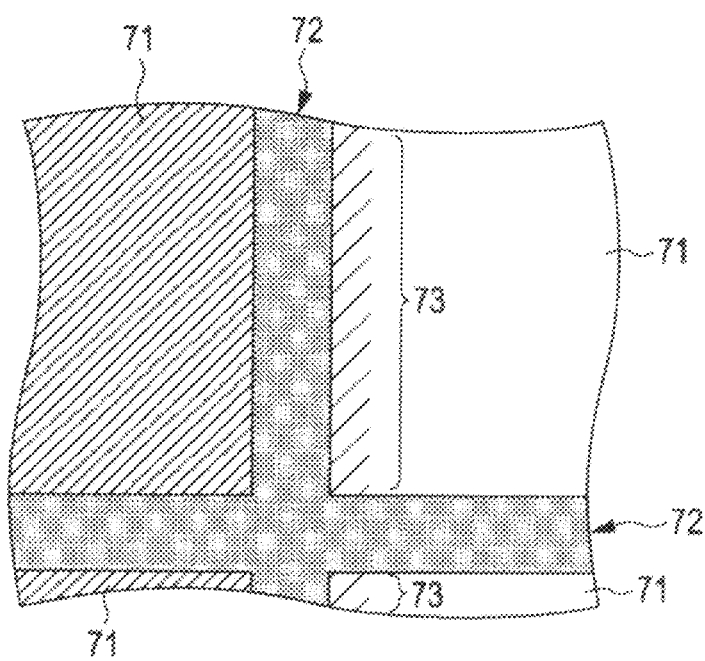
FIG. 11 is a schematic diagram illustrating a display scattering generated in a display area.
Figure 12:
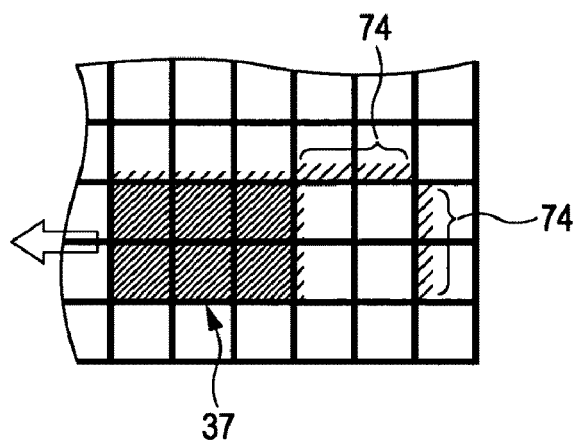
FIG. 12 is a schematic diagram illustrating a state where an afterimage is generated at the time of displaying a moving picture.

Here, for example, as shown in FIG. 10, in cases where shielding area 72 of a width D1 is formed between display areas 71, the width of the shielding area 72 is W2 which is narrower than width W1 so as to enlarge an aperture ratio of the pixel 11. Further, while for the sake of convenience of description, a black matrix layer 18 is omitted from FIG. 10, shielding section 18A is formed corresponding to the shielding area 72. In this case, for example, as shown in FIG. 10, when +5 V is applied to one pixel electrode 13, 0 V is applied to a pixel electrode 13 adjoining thereto, and 0 V is applied to the counter electrode 17, a large lateral electric field E is generated between the pixels 11. In the past, for example, as shown in FIG. 11, alignment scattering 73 caused by the lateral electric field E is hereby generated in the display area 40 of the pixel 11 corresponding to the pixel electrode 13 to which +5 V is applied. In addition, when a moving picture is displayed in a state where such alignment scattering 73 is generated, the movement of the liquid crystal molecule 15A becomes uncertain in the course when the alignment scattering 73 returns to the original normal state. As a result, for example, as shown in FIG. 12, when a moving picture in which the dark section 37 moves in a left direction is displayed, there is a problem in which an afterimage 74 appears in the pixel 11 which is adjacent to the place where the dark section 37 exists before 1 field. Further, the position of appearance of afterimage 74 differs according to the deposition direction of alignment films 14 and 16. FIG. 12 schematically illustrates afterimage 70 appearing when alignment films 14 and 16 have an alignment property in which the liquid crystal molecule 15A is inclined at pre-tilt angle θ in a first quadrant direction as shown in FIG. 4A.

Meanwhile, in the present embodiment, positional information A(n) is extracted based on the video signal Din(n) of the input order n and the deposition direction information 30A, and at the same time, positional information A(n−1) is extracted based on the video signal Din(n−1) of the input order n−1 and the deposition direction information 30A. Here, the positional information A(n) corresponds to the positional information on the pixel 11 in which when a video is displayed in the display section 10 based on the video signal Din(n), alignment scattering 73 caused by the lateral electric field E generated between the pixels 11 can occur. Meanwhile, the positional information A(n−1) corresponds to the positional information on the pixel 11 in which when a video is displayed in the display section 10 based on the video signal Din(n−1), alignment scattering 73 caused by the lateral electric field E generated between the pixels 11 can occur. For that reason, the positional information $B_2(n)$ which is calculated based on the positional information A(n−1) and the positional information A(n) corresponds to the positional information on the pixel 11 that can be displayed as an afterimage at the time of the display of the moving picture. Accordingly, it is possible to reduce an occurrence of afterimage that can be generated at the time of display a moving picture, by adding a predetermine correction amount to the video signal Din(n) of the pixel 11 corresponding to the positional information $B_2(n)$.

Figure 13A:
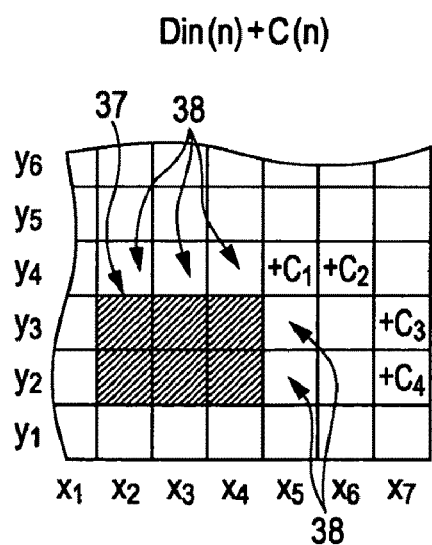
FIGS. 13A and 13B are concept diagrams illustrating a position of the pixel to be corrected.
Figure 13B:
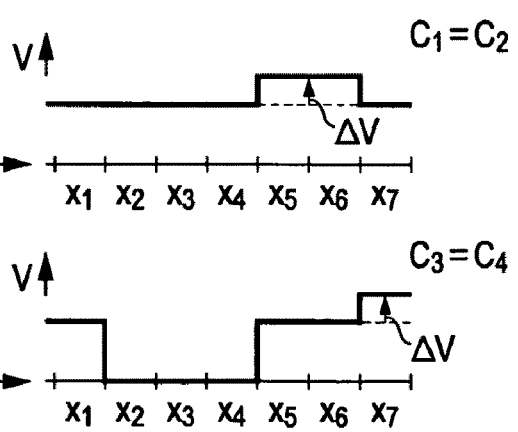

For example, as shown in FIG. 13A, above-mentioned correction is performed with respect to the video signal Din corresponding to the pixel 11 which contacts neither the upper side nor the right side of the dark section 37. Concretely, for example, as shown in FIG. 13B, with respect to x coordinate x5 and x6 which are different from x coordinate (x2 to x4) of the dark section 37, in video signal 21a of the row y4, an overdrive voltage ΔV is added as correction amounts $C_1$ and $C_2$. Similarly, with respect to x coordinate x7 which is different from an x coordinate (x2 to x4) of the dark section 37 in video signal 21a of the rows y2 and y3, an overdrive voltage ΔV is added as correction amounts $C_3$ and $C_4$. This position to be corrected is different from position 38 (see FIG. 13A) of the pixel 11 that is subject to overdrive processing that generally exists from the past. Accordingly, it is possible to perform the correction processing of the present embodiment in dependently of the usual overdrive processing without affecting the usual overdrive processing.

In particular, when an edge enhancement is performed as the overdrive processing, an extremely large lateral electric field is generated between the pixel 11 of the position 38 and the pixel 11 of the dark section 37. In such a case, it is possible to reduce an occurrence of afterimage caused by the large lateral electric field at the time of display of a moving picture without deteriorating an effect of the edge enhancement.

APPLICATION EXAMPLE

Next, one application example of the liquid crystal display panel 10 of above embodiment will be described. A projector relating to the application example uses the liquid crystal display panel 10 of above embodiment as a light valve (a spatial light modulating section 130 described later).

FIG. 14 illustrates one example of the schematic construction of the projector 100 (image display apparatus) relating to the present application example. For example, the projector 100 projects the image displayed on a picture plane of an information processing apparatus (not shown) onto a screen 200.

For example, the projector 100 is a three panel type transmission projector, and for example, as shown in FIG. 14, it has a light emitting section 110, an optical path divergence section 120, a spatial light modulating section 130, a synthetic section 140, and a projection section 150. In addition, the light emitting section 110, the optical path divergence section 120, the spatial light modulating section 130, and the synthetic section 140 of application example correspond to one concrete example of an image light generating section of application example.

The light emitting section 110 provides a light beam illuminating an illuminated surface of the spatial light modulating section 130, and for example, it includes a white light source lamp and a reflector mirror formed behind the lamp. The light emitting section 110 may have a certain optical element, in an area (on optical axis AX) through which a light 111 of the lamp passes, as necessary. For example, it is possible to place, on the optical axis AX of the lamp, a filter for reducing the lights other than visible rays in the lights 111 of the lamp, and an optical integrator that uniformizes an illuminance distribution on the illuminated surface of the spatial light modulating section 130, in this order from the lamp side.

The optical path divergence section 120 divides the light 111 output from the light emitting section 110 into the light of plural colors with different wavelength ranges, to lead each color light to the illuminated surface of the spatial light modulating section 130. For example, as shown in FIG. 14, the optical path divergence section 120 includes one cross mirror 121 and four mirrors 122. The cross mirror 121 divides the light 111 output from the light emitting section 110 into the light of plural colors with different wavelength ranges, and at the same time branches optical paths of each color light. For example, the cross mirror 121 is placed on the optical axis AX, and it is constituted by crossing and connecting the two mirrors having different wavelength selection properties. Four mirrors 122 reflect the color light (red light 111R, blue light 111B in FIG. 14) branched in the light path by the cross mirror 121, and they are arranged in a place which is different from the optical axis AX. Two mirrors 122 in the four mirrors 122 are arranged so as to lead the light (red light 111R in FIG. 14) reflected in one direction intersecting the optical axis AX by one mirror contained in the cross mirrors 121 to an illuminated surface of a spatial light modulating section 130R (described later). The remaining two mirrors 122 in the four mirrors 122 are arranged so as to lead the light (blue light 111B in FIG. 14) reflected in another direction intersecting the optical axis AX by another mirror contained in the cross mirrors 121 to an illuminated surface of a spatial light modulating section 130B (described later). In addition, in the light 111 output from the light emitting section 10, the light (green light 111G in FIG. 14) transmitting through the cross mirrors 121 and passing through the optical axis AX enters an illuminated surface of a spatial light modulating section 130G (described later) placed on the optical axis AX.

The spatial light modulating section 130 modulates the light of plural colors for each color light and generates modulated light for each color light, in response to video signal Din input from the information processing apparatus not shown. For example, the spatial light modulating section 130 includes the spatial light modulating section 130R for modulating the red light 111R, the spatial light modulating section 130G for modulating the green light 111G, and the spatial light modulating section 130B for modulating the blue light 111B. In addition, the spatial light modulating section 130R, the green light 111G, and the spatial light modulating section 130B are constituted by the liquid crystal display panel 10 of above embodiment.

For example, the spatial light modulating section 130R is a transmissive liquid crystal panel and is arranged in an area which is opposite to one surface of the synthetic section 140. The spatial light modulating section 130R modulates the incident red light 111R based on the video signal Din to generate red image light 112R, and outputs the red image light 112R to one surface of the synthetic section 140 behind the spatial light modulating section 130R. For example, the spatial light modulating section 130G a transmissive liquid crystal panel and is arranged in an area which is opposite to another surface of the synthetic section 140. The spatial light modulating section 130G modulates the incident green light 111G based on the video signal Din to generate green image light 112G, and outputs the green image light 112G to another surface of the synthetic section 140 behind the spatial light modulating section 130R. For example, the spatial light modulating section 130B is a transmissive liquid crystal panel and is arranged in an area which is opposite to another surface of the synthetic section 140. The spatial light modulating section 130B modulates the incident blue light 111B based on the video signal Din to generate blue image light 112B, and outputs the blue image light 112B to another surface of the synthetic section 140 behind the spatial light modulating section 130R.

The synthetic section 140 synthesizes a plurality of the modulated lights to generate image light. The synthetic section 140, for example, is arranged on the optical axis AX, and, for example, is a cross prism which is constituted by the bonding of four prisms. On bonding surfaces of the prisms, two selective reflection surfaces having different wavelength selection properties are formed by, for example, multilayer interference film or the like. For example, one selective reflection surface reflects the red image light 112R output from the spatial light modulating section 130R in a direction which is parallel to the optical axis AX to lead in a direction of the projection section 150. Further, another selective reflection surface, for example, reflects the blue image light 112B output from the spatial light modulating section 130B in a direction which is parallel to the optical axis AX to lead in a direction of the projection section 150. Further, the green image light 112G output from the spatial light modulating section 130G transmits through two selective reflection surfaces, thereby advancing in a direction of the projection section 150. Finally, the synthetic section 140 functions so as to synthesize image lights which are generated by the spatial light modulating sections 130R, 130G and 130B, respectively, to generate image light 113, and output the generated image light 113 to the projection section 150.

The projection section 150 projects the image light 113 output from the synthetic section 140 onto the screen 200 to display the image. The projection section 150 is, for example, arranged on the optical axis AX, and for example, is constituted by the projection lens.

In the present application example, as the spatial light modulating sections 130R, the green light 111G and the spatial light modulating sections 130B, the liquid crystal display panel 10 of above embodiment is used. The correction is hereby performed with respect to the video signal Din corresponding to the pixel 11 in which alignment scattering caused by the lateral electric field generated between the pixels 11 can be displayed as an afterimage at the time of the display of the moving picture. As a result, it is possible to reduce an occurrence of afterimage caused by the lateral electric field generated between the pixels 11 at the time of the display of the moving picture.

Further, in the present application example, as described in above embodiment, a correction of afterimage is performed to the video signal Din corresponding to the pixel 11 that does not contact the dark section 37. Accordingly, correction processing of the present application example can be performed independently of the usual over drive processing without affecting the usual over drive processing. As a result, for example, since the edge enhancement can be performed together with the correction processing of the present application example, it is possible to display a moving picture sharply, while reducing the occurrence of afterimage caused by the large lateral electric field at the time of the display of the moving picture.

While the present invention was described by way of the embodiment and application example, the invention is not limited thereto, and various modifications can be made.

For example, in above embodiment or the like, invention was described as being applied for reducing afterimage generated in a bright pixel 11 adjoining the dark section 37, together with a change of the display position of the dark section 37. However, when the bright section is moved in the dark section, it is of course possible to apply the present invention for reducing afterimage generated in the bright section (outer edge of the bright section).

Further, in above embodiment or the like, in cases where the direction $D_1$ has a positive horizontal component, there was an exemplification of a calculation of the horizontal difference by subtraction of the video signal Din of the left side pixel 11 of the pixels 11 from the video signal Din of singled out pixel 11. However, according to the deposition method, it may be desirable to calculate the horizontal difference by subtracting the video signal Din of the right side pixel 11 of the pixels 11 from the video signal Din of singled out pixel 11. Accordingly, it is desirable to define a way to obtain the difference according to the deposition method. In addition, in above case, when the horizontal difference is equal to or greater than a predetermined threshold, for example, a positional information on the singled out pixel 11 (namely, left side pixel 11 in the two pixels 11 of the calculation source of the difference) is extracted.

Further, while in above application example, the liquid crystal display panel 10 is a transmissive liquid crystal panel, it may be a reflective liquid crystal display panel. However, in such a case, an arrangement of the liquid crystal display panel 10 is different from above described position.

In addition, while in above application example, application of the liquid crystal display device to the projector was described, it is of course applicable to other display devices.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display apparatus comprising:
a plurality of pixels arranged in a matrix shape; and
a drive circuit for actively driving the plurality of pixels;
wherein each of the pixels has a laminated structure including a pixel electrode, a first alignment film, a liquid crystal layer, a second alignment film, and a counter electrode,
wherein the liquid crystal layer includes a liquid crystal molecule having a vertical alignment property,
wherein the first alignment film and the second alignment film are inorganic alignment films formed by obliquely depositing an inorganic material,
wherein the drive circuit has
a first calculation section which calculates a first difference by obtaining a difference in first video signals, of the two pixels which are adjacent to each other, considering a deposition direction of the inorganic alignment film, and thereafter, when the first difference is equal to or larger than a predetermined threshold, extracts a first positional information on the pixels corresponding to the deposition direction of the inorganic alignment film in the two pixels of the calculation source of the difference;
a second calculation section which calculates a second difference by obtaining a difference in second video signals anterior to the first video signals, of two pixels which are adjacent to each other, by one field, considering the deposition direction of the inorganic alignment film, and thereafter, when the second difference is equal to or larger than the threshold, extracts a second positional information on the pixels corresponding to the deposition direction of the inorganic alignment film in the two pixels of the calculation source of the difference;
a third calculation section for calculating a third positional information on the basis of the first positional information and the second positional information; and
a fourth calculation section for calculating a third video signal by adding a predetermined correction amount to the first video signal of the pixels corresponding to the third positional information.

2. The liquid crystal display apparatus according to claim 1,
wherein the first alignment film has an alignment property that inclines the liquid crystal molecule in an in-plane first direction, when seen from a front direction of the liquid crystal display apparatus, when no voltage is applied to the pixel electrode and the counter electrode; and
wherein the second alignment film has an alignment property that inclines the liquid crystal molecule in a direction which is actually opposite to the first direction, when seen from a front direction of the liquid crystal display apparatus, when no voltage is applied to the pixel electrode and the counter electrode.

3. The liquid crystal display apparatus according to claim 2,
wherein when the first direction has horizontal components, the first calculation section calculates the first difference by obtaining a difference in the first video signals of the two horizontally adjacent pixels, and at the same time, the second calculation section calculates the second difference by obtaining a difference in the second video signals of the two horizontally adjacent pixels.

4. The liquid crystal display apparatus according to claim 2,
wherein when the first direction has vertical components, the first calculation section calculates the first difference by obtaining a difference in the first video signals of the two vertically adjacent pixels, and at the same time, the second calculation section calculates the second difference by obtaining a difference in the second video signals of the two vertically adjacent pixels.

5. The liquid crystal display apparatus according to any one of claims 1 to 4,
wherein the fourth calculation section changes the correction amount based on the second video signal.

6. The liquid crystal display apparatus according to any one of claims 1 to 4,
wherein the fourth calculation section changes the correction amount based on color information of the pixel corresponding to the third positional information in the second video signal.

7. The liquid crystal display apparatus according to any one of claims 1 to 4,
wherein the fourth calculation section changes the correction amount based on temperature information of the pixel.

* * * * *